May 21, 1935.  H. HUEBER  2,002,319

MOTOR VEHICLE COOLING SYSTEM

Filed July 30, 1932     3 Sheets-Sheet 1

INVENTORS
*Henry Hueber*
BY
*Bean & Brooks*, ATTORNEYS

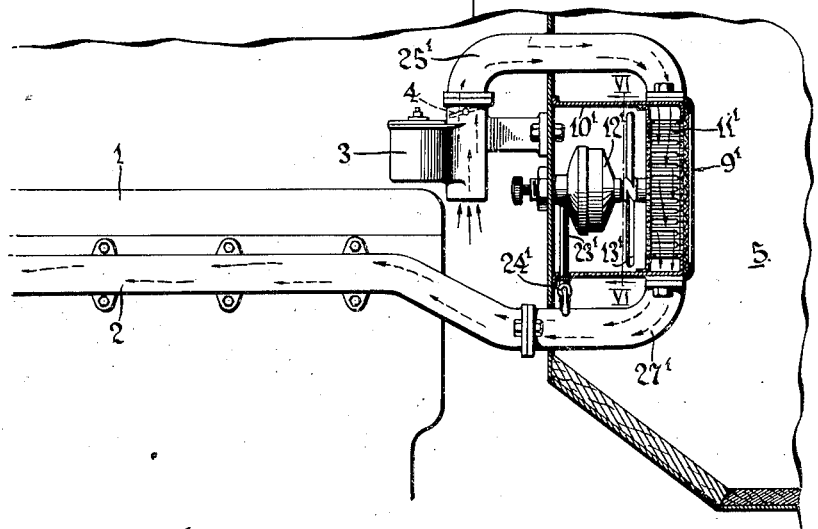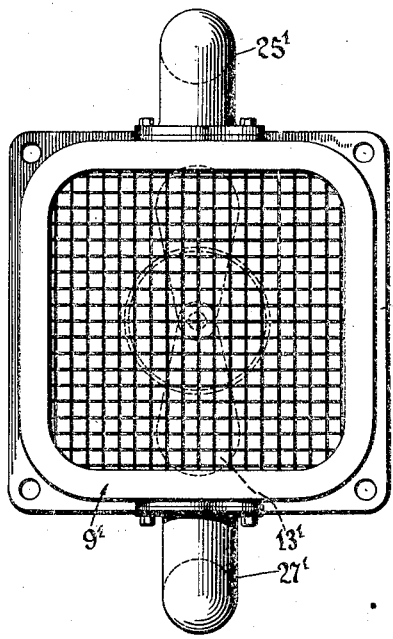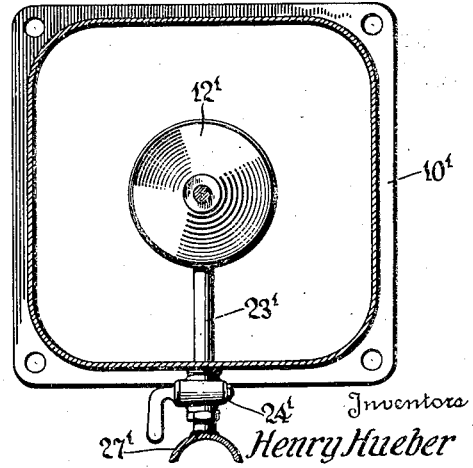

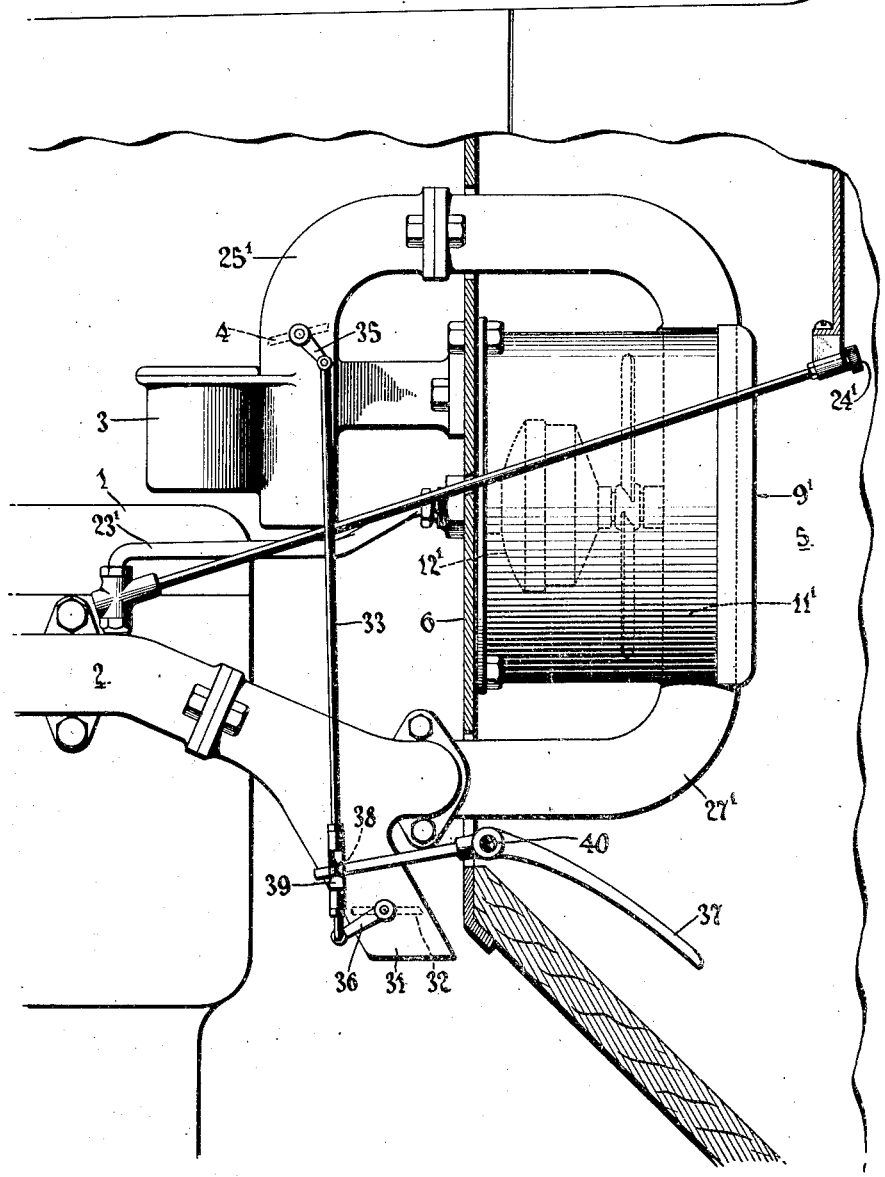

Patented May 21, 1935

2,002,319

UNITED STATES PATENT OFFICE 2,002,319

MOTOR VEHICLE COOLING SYSTEM

Henry Hueber, Buffalo, N. Y., assignor to Tricc Products Corporation, Buffalo, N. Y.

Application July 30, 1932, Serial No. 627,076

3 Claims. (Cl. 62—152)

This invention relates to cooling systems and particularly to a cooling apparatus primarily adapted to be used for cooling the passenger compartment of an automobile.

Because of the particular construction of automobiles today, and the placing of the internal combustion engine in a position directly forward of the passenger compartment, a considerable amount of heat radiates from the engine into the passenger compartment. This heat is especially noticeable and objectionable in warm weather particularly in the space and area about the brake and clutch pedals, and often causes great discomfort to the passengers in the front seat.

It is the object of the present invention to cool the passenger compartment of the motor vehicle in a novel manner. Further, the invention has for its object to provide a cooling system in which the evaporative action of the liquid or moisture content of the combustible mixture, in passing through the intake manifold, is utilized to absorb heat from an air stream to cool the same for subsequent delivery to the passenger compartment.

In the particular embodiments of the invention shown in the accompanying drawings:

Fig. 4 is a showing of a modified embodiment of the invention.

Fig. 5 is a front elevation of the modified form.

Fig. 6 is a sectional view taken on line 6—6 of Fig. 4.

Fig. 7 is a fragmentary view, partly in section, of a construction embodying another form of the invention.

Figure 1:
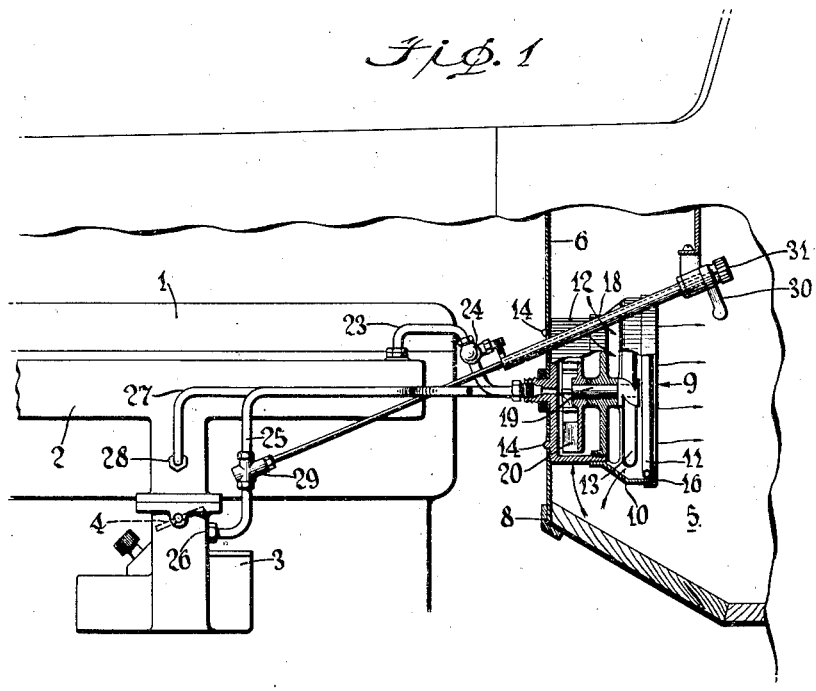
Fig. 1 is a view, partly in section, showing a motor vehicle equipped with the present invention.
Figure 2:
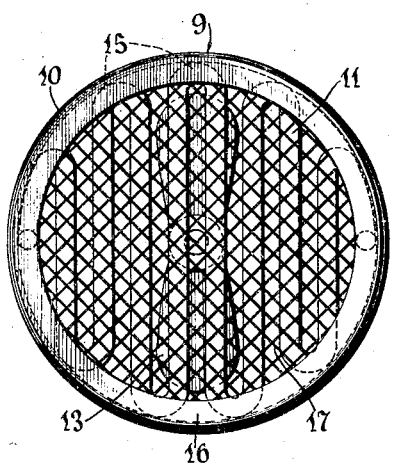
Fig. 2 is a front elevational view of the cooling unit itself.
Figure 3:
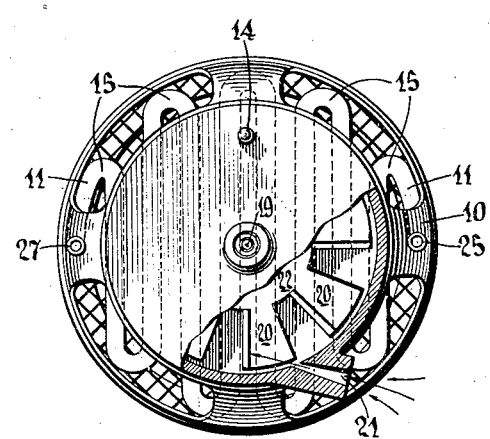
Fig. 3 is a rear elevational view of the unit with parts broken away showing the suction operated motor.

Referring to Figs. 1, 2 and 3, an internal combustion engine 1 is provided with an intake manifold 2, carburetor 3 and throttle 4. The engine is mounted in a conventional manner in a motor vehicle having a passenger compartment 5. Separating the passenger compartment from the internal combustion engine is a dash board or other suitable partitioning means 6 which is attached in the usual manner to the cowl and the chassis frame 8 and extends therebetween.

Mounted within the passenger compartment, preferably in a suitable and convenient position above the floor boards, is a cooling unit or member 9 which comprises a casing 10, a core 11 within said casing, and means for supplying an air current, such as a motor 12 and a fan 13 positioned within the casing and connected thereto, said fan being used to create or provide an air current for passage over the cooling coil and on into the passenger compartment to cool the passengers. The cooling unit may be attached to the dash in the desired position by any suitable means such as bolts or studs as shown at 14.

The cooling core or coil 11 within the casing 10 may be formed in a continuous series of U-shaped bends 15 and is disposed in the front of the casing, as shown in Fig. 2. By placing the coil within the casing in this manner a maximum amount of cooled surface is provided and hence more cooling of the air which passes over these coils is effected.

The casing may be constructed of thin sheet metal and is preferably cylindrical in shape, deep enough to house the coiled or looped core and the fan 13. The front end of the casing may be formed with a circumferential flange 16 to which a protective wire mesh, net or other suitable screen-like structure 17 may be attached. The casing is shown attached to the motor housing in any conventional manner, as at 18. The fan 13 is attached to the drive shaft 19 of the motor 12, preferably of the suction type, as illustrated in Figs. 1, 2 and 3. This suction operated motor is constructed on the turbine principle wherein a stream of fluid, which in this case is air, impinges a series of vanes or blades 20 on shaft 19 to cause rotary motion. At a point on the outer peripheral portion of the casing is a port 21 which acts as a nozzle and connects the inside of the casing to the atmosphere. The port is in such a position that any fluid passing through said port will impinge in jet form the vanes 20 of the turbine wheel 22.

The motor housing is connected by a duct 23 to a suitable source of suction, such as the intake manifold 2 of the internal combustion engine 1; the duct 23 may be opened and closed by means of valve 24. Thus, the inside of the casing can be subjected to a pressure less than atmospheric. Because of the pressure differential between the inside and the outside of the casing brought about by opening the valve 24 air will be drawn through the nozzle 21, will impinge the blades or vanes 20 of the turbine wheel and cause a rotating movement of the shaft 19. In this manner the fan 13 is caused to rotate and create an air current to pass over the cooling core and into the passenger compartment of the motor vehicle.

One end of the core 11 which is housed in the casing 10 is connected by a duct or tube 25 to the intake manifold 2 at a position between the throttle or butterfly valve 4 and the carburetor 3, as shown at 26. The other end of the core 11 is connected by means of a duct 27 to the intake manifold at a position between the butterfly valve 4 and the cylinders of the internal combustion engine, as shown at 28. In this manner the cooling coil is connected to a source of suction or below atmospheric pressure at one end and to a source of supply of the combustible mixture at the other.

Thus in the normal operation of the engine, the combustible fluid is passed from the carburetor into the intake manifold in an aspirated state. That is, the gasoline or combustible fluid is broken up into minute globules or particles which are held in suspension in this form in the air that is present when the carburetor functions in its normal manner. In this form it is called the combustible mixture, being a mixture of gasoline and air in aspirated form.

The combustible, now in this aspirated form, passes up through the intake manifold and into the engine cylinders in an amount depending on the degree to which the butterfly or throttle valve is open, and in so passing the minute globules of liquid vaporize and thereby absorb heat from the walls of the manifold. This results in a cooling action in the manifold. By means of the duct 25 by-passing a portion of this combustible mixture through the cooling coil 11, the latter is cooled.

The principle involved in the operation of this device is similar to the fundamental refrigeration principle in which the evaporation of a liquid is utilized to take up or absorb heat from the surrounding fluid and chamber walls, which in this case are the walls of evaporating coil or core 11, and thereby causes a cooling of the same. Thus, as more of this fluid is passed into the coil and evaporation carries on, more heat is taken from the tube and results in a general cooling of the pipe surfaces so that as the fan 13 directs an air flow thereover such air will likewise be cooled for passage into the passenger compartment.

The flow through the core 11 is induced by the suction above the throttle, acting through the pipe 27. With the throttle closed, this induction is intensified so that the flow through the core will be increased thereby intensifying the cooling action of the core on the air stream passing thereover. Such flow through the cooling unit is controlled by a valve 29 in the conduit 25. The valve 24 for the motor and the valve 29 for the unit are rendered accessible to the motorist by extending their handles 30 and 31, respectively, within his reach. To conserve space these handles may be combined, as illustrated.

In the form of the invention illustrated in Figs. 4, 5 and 6, the automotive vehicle is provided with its internal combustion engine 1, an intake manifold 2 and a carburetor 3. In this form of the invention the carburetor is connected to the intake manifold only through the cooling unit, or, in other words, the entire flow of the combustible mixture is passed directly through the cooling unit. To this end the conduit or pipe 25' leads from the carburetor 3 to the member or cooling unit 9', and the latter is connected at its lower end by a conduit 27' to the intake manifold. That is, the radiator is in the direct circuit between the carburetor and the intake manifold or engine so that all of the gasoline coming from the carburetor in aspirated form must pass through the radiator before reaching the intake manifold. This will enable the use of a larger cooling unit and insure greater capacity.

As shown in Fig. 4 the radiator may be mounted in the passenger compartment 5 of the motor vehicle. The core 11' of the cooling unit may be of cellular formation, and the fan 13' is so disposed as to direct a flow of air therethrough or thereover on its passage to the passenger compartment. A housing 16' encloses the fan and finds support on the vehicle body. The fan motor 12' may also be supported in and by the housing 16' and have its suction port connected to the intake manifold by means of a conduit 23' which is opened and closed by a valve 26'. The engine throttle valve 4 may be used, in this form of the invention, as the unit controlling valve in place of the separate valve 29 of Fig. 1, although in such former embodiment the throttle valve 4 will serve to vary or control the flow through the core 11, according to the position of the throttle valve, providing the valve 29 remains open. Thus, both throttle valves serve to control the cooling unit.

Fig. 7 illustrates still another form of the invention similar to that shown in Figs. 4, 5, and 6, with certain variations in structure to be herein pointed out. It will therefore be unnecessary to describe this additional form of the invention in entirety as like reference numerals have been used on the parts corresponding to those shown in Figs. 4, 5 and 6.

As illustrated, a cooling unit 9' is mounted in the passenger compartment 5 of a motor vehicle. This unit, however, differs from the one shown in Figs. 4, 5 and 6, in that it is provided with means for limiting the amount of air taken in through the carburetor 3, when said carburetor functions in the normal manner. There are various ways of accomplishing this result, but as illustrated, the limiting means is embodied in the throttle valve 4 of the internal combustion engine. The adjustment of the valve 4 is such that only enough air is admitted through the carburetor to produce the most efficient evaporation of the combustible mixture and hence produce the greatest cooling in the core 11' for a given amount of gasoline.

It can be readily seen that if the amount of air admitted to the carburetor is reduced, or changed in any way, the gasoline mixture will not be in proper condition for combustion when it reaches the engine cylinders. Therefore, in addition to providing a means for limiting the amount of air supplied to the carburetor to effect a more efficient evaporation of the combustible mixture and hence a greater cooling action, means is provided for admitting more air to the gasoline mixture after it has passed through the cooling core 11', so that the internal combustion engine will function normally when the gasoline reaches the cylinders.

As shown in Fig. 7, such a means may comprise an air inlet pipe 31 equipped with a throttle valve 32 connected in any convenient position to the conduit 27' or the intake manifold. An adjustable connecting member 33 has one end pivoted to one end of an arm 35 of the throttle valve 4 and its other end is similarly connected to one end of an arm 36 of the valve 32. An outer end portion of an accelerator pedal 37 is disposed loosely through a slotted portion 38 of the connecting member 33 to insure proper actuation of the latter by the pedal. A suitable pivot 40 supports the pedal upon the vehicle dash 6.

When the accelerator pedal 37 is operated, both the valves will be opened to the proper degree. In this manner the throttle valve 4 will admit only enough air to bring about the most efficient evaporation of the gasoline mixture, and at the same time, the valve 32 will admit additional air to the manifold in quantities sufficient to insure the normal operation of the engine.

Although only the preferred forms of the invention have been shown and described in detail, it will be apparent to those skilled in the art that the invention is not so limited, but that various changes may be made therein without departing from the spirit of the invention or the scope of the appended claims.

What is claimed is:

1. In a motor vehicle having a passenger compartment, a cooling system for the passenger compartment comprising, in combination with the intake manifold and the carburetor of the internal combustion engine of the motor vehicle power plant, a cooling member having an inlet connected to the carburetor and an outlet connected to the intake side of the engine, means for admitting air to the carburetor to partially form a combustible mixture, such mixture passing through said cooling member on its way to the engine to effect a cooling of said cooling member by the evaporative action of the mixture as it passes through said member, means for admitting an additional quantity of air to such mixture between the cooling member and the intake manifold to complete the formation of the combustible mixture, and means for directing an air stream over the cooling member for discharge into the passenger compartment.

2. The method of cooling the passenger compartment of an automotive vehicle having an internal combustion engine as its means of propulsion, which consists in admitting a quantity of air to the engine carburetor to partially form a combustible mixture, causing such mixture to flow through a cooling member to the intake side of the engine whereby to absorb the heat from said cooling member by the evaporative action of the liquid particles contained in such mixture, adding an additional quantity of air to such mixture between the cooling member and the intake side of the engine to complete the formation of the combustible mixture, and causing an air stream to pass over the cooling member and into the passenger compartment.

3. In a motor vehicle having a passenger compartment, a cooling system for the passenger compartment comprising, in combination with the intake manifold and the carburetor of the internal combustion engine of the motor vehicle power plant, a cooling member having an inlet connected to the carburetor and an outlet connected to the intake side of the engine, means for admitting air to the carburetor to partially form a combustible mixture, such mixture passing through said cooling member on its way to the engine to effect a cooling of said cooling member by the evaporative action of the mixture as it passes through said member, means for admitting an additional quantity of air to such mixture between the cooling member and the intake manifold to complete the formation of the combustible mixture, means for controlling the admission of air through both of the aforesaid means, and means for directing an air stream over the cooling member for discharge into the passenger compartment.

HENRY HUEBER.